(12) United States Patent
Niwa

(10) Patent No.: US 6,315,454 B1
(45) Date of Patent: Nov. 13, 2001

(54) CERAMIC BEARING BALL

(75) Inventor: Tomonori Niwa, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/518,376

(22) Filed: Mar. 3, 2000

(30) Foreign Application Priority Data

Mar. 4, 1999 (JP) .................................................. 11-056999

(51) Int. Cl.$^7$ .................................................. F16C 33/32
(52) U.S. Cl. ........................................ 384/492; 384/907.1
(58) Field of Search ................................. 384/492, 907.1

(56) References Cited

U.S. PATENT DOCUMENTS

| | | | |
|---|---|---|---|
| 4,831,471 | * 5/1989 | Tsujisawa | 360/78.04 |
| 5,485,331 | 1/1996 | Dunfield et al. . | |
| 5,524,985 | * 6/1996 | Dunfield | 384/107 |
| 5,581,420 | * 12/1996 | Chainer et al. | 360/75 |
| 5,642,947 | 7/1997 | Akamatsu et al. . | |

FOREIGN PATENT DOCUMENTS

| 42 01 615 A1 | 7/1993 | (DE) . |
|---|---|---|
| 2 219 359 A | 12/1989 | (GB) . |

OTHER PUBLICATIONS

H.J. Boving et al., "Properties and Performance of Chemical–Vapour–Deposited TiC–Coated Ball–Bearing Components," *Thin Solid Films*, vol. 153, No. 1, Oct. 26, 1987, pp. 253–266.

* cited by examiner

Primary Examiner—Thomas R. Hannon
(74) Attorney, Agent, or Firm—Sughrue, Mion, Zinn, Macpeak & Seas, PLLC

(57) ABSTRACT

A ceramic bearing ball capable of preventing irregular vibrations of, for example, a hard disk drive and having a high accuracy. The ceramic ball is characterized as having a sphericity of not more than 0.08 μm, a surface roughness of not more than 0.012 μm and a maximum surface pore size of 5 μm.

5 Claims, 1 Drawing Sheet

CERAMIC BEARING BALL

FIELD OF THE INVENTION

This invention relates to bearing balls of the type which find use in, for example, computer hard disk drives, semiconductor wafer transfer devices, a HDD carriage arm and other devices which require low vibration operation.

BACKGROUND OF THE INVENTION

Bearing devices which make use of balls or rollers arranged between outer and inner races are widely used for the smooth running of rotary components in equipment of the most diverse sizes from heavy industrial equipment to electronic devices. Traditionally, such bearing balls and rollers have been manufactured from steel but, in recent years, ceramic materials, such as, for example, silicon nitride also have been used.

Steel and super-steel have heretofore been the material of choice for bearing balls in, for example, hard disk drives for computers. However, with improvements in computer performance, higher rotational frequencies have been demanded, and, accordingly, it has become necessary to make use of ceramic materials (ball manufacturing material) for the manufacture of bearing balls. One type of hard disk drive of the nature incorporating ceramic bearing balls is described and illustrated in U.S. Pat. No. 5,485,331 to Dunfield et al., issued Jan. 16, 1996.

Since the density of ceramic materials is generally lower than that of steel, the weight and hence the frictional resistance of ceramic bearing balls is correspondingly lower. Also, since the thermal expansion coefficient of ceramic materials is lower than that of steel, the dimensional accuracy can be improved. A ceramic material also has the advantage of requiring less lubricant.

However, merely selecting a ceramic material for a bearing ball is not necessarily sufficient in itself. For example, in a computer hard disk drive, irregular bearing vibrations during the storage (writing) and reading of data constitutes a potentially fatal performance drawback. Balls for such a bearing therefore demand a greater performance accuracy than that of the bearing balls used in a machine tool, for example.

It is therefore an object of the present invention to provide a ceramic bearing ball which is capable of preventing irregular vibration of, for example, a hard disk drive incorporating the ceramic bearing ball.

SUMMARY OF THE INVENTION

In accordance with a first aspect of the invention, a ceramic ball is provided characterized by a sphericity of not more than 0.08 $\mu$m, a surface roughness of not more than 0.012 $\mu$m and a maximum surface pore size of 5$\mu$m.

According to the another aspect of the invention, a disk drive bearing is provided having inner and outer races, and accommodated between the races, a plurality of ceramic bearing balls. The bearing has a raceway run-out of less than the pitch of a hard disk memory track, preferably less than one-half, more preferably less than one-third the pitch of a hard disk drive memory track.

It will be understood that if the pitch or width between memory tracks on the surface of the hard disk that is rotated by the disk drive motor is smaller than the sphericity tolerance, then there is a great risk that reading information/ data recorded on the surface of the hard disk will not be achieved by a laser or magnetic head reader. The reason for this is that the raceway run-out in the motor bearing directly affects reading accuracy of data in the memory track. This is because the hard disk is located by the inner or outer race of the disk drive motor bearing.

A ceramic ball according to the present invention having the above characteristics has an excellent surface condition and high dimensional accuracy. Accordingly, when such a ceramic ball is used in a bearing in, for example, a computer hard disk drive, irregular bearing vibration rarely occurs. As a result, the writing and reading of data can be achieved accurately and reliably.

The sphericity, surface roughness and maximum pore size can be characterized as follows.

1. Sphericity

The specifications concerning steel balls for ball bearings according to JIS B1501 are used for characterizing the ceramic bearing balls according to the present invention. Sphericity is therefore determined by measuring two or three equatorial dimensions, at mutual right angles, using an instrument which measures maximum radial distances between the respective circumscribed circles and the spherical surface.

2. Surface Roughness

The specifications concerning steel balls for ball bearings according to JIS B1501 are also used for characterizing the ceramic bearing balls according to the present invention. Surface roughness is therefore determined as the center line average roughness from measuring an equatorial surface of a ceramic bearing ball with a measuring instrument of the type stipulated in JIS B0651 (tracer type surface roughness measuring instrument).

3. Maximum Pore Size

Figure 1:
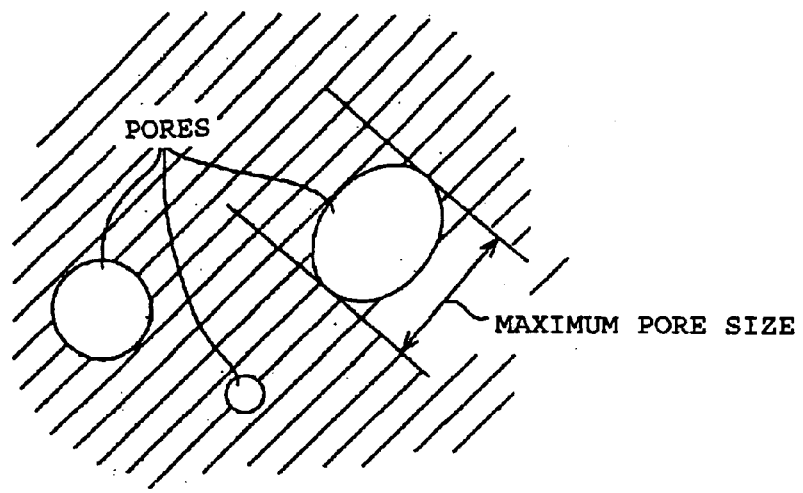
FIG. 1 is an explanatory view showing maximum pore sizes.

The maximum pore size is the largest pore diameter as shown in FIG. 1 of the drawings of pores exposed at the surface of the ceramic bearing ball, and the largest diameter of the largest pore when there are a plurality of such pores. The measurement of the maximum pore size can be made by using, for example, the image of the surface of the ceramic bearing ball taken from, for example, a metallurgical microscope or SEM.

Preferably, the ceramic bearing ball of the present invention has a maximum internal pore size of not more than 5 $\mu$m.

It is considered that, when a ceramic bearing ball has pores, those pores exist not only on the surface thereof but also in an inner portion thereof. Accordingly, when the shape and size of the ceramic bearing ball are adjusted or regulated by polishing the ball, the pores in the interior portion thereof are necessarily exposed to the surface.

Preferably, silicon nitride is used as the main component of the ceramic bearing ball, endowing the ball with advantageous properties such as hardness, weight and friction loss. Other ceramic materials, for example alumina, SiC, zirconia, composite materials of alumina zirconia and cermet can also be employed.

DETAILED DESCRIPTION OF THE INVENTION

An example of a ceramic bearing ball according to the present invention will now be described with reference to the drawings.

The ceramic bearing ball in this embodiment has as its main component silicon nitride, and the ceramic ball comprises, for example, 94 wt. % silicon nitride, 3 wt. % aluminum oxide and 3 wt. % yttrium oxide. This ceramic bearing ball is a regular sphere of, for example, 2 mm diameter, which has a sphericity of not more than 0.08 μm, for example 0.02 μm, a surface roughness of not more than 0.012 μm, for example 0.001 μm, and a maximum surface pore size of not more than 5 μm, for example 2 μm.

The raw material for the ceramic bearing ball is prepared as a slurry obtained by compounding 1–10 parts by weight of sintering aid powder (for example, a mixture of aluminum oxide and yttrium oxide) with 100 parts by weight of silicon nitride powder, and subjecting the resultant mixture to wet mixing (or wet mixing-pulverization) in a ball mill or an attritor using, for example, pure water as a solvent.

This slurry is then supplied to a raw powder preparation apparatus of the type shown in, for example, Japanese Patent Application No. 290798/1998, to prepare raw powder. The raw powder thus prepared is molded (granulated) to a spherical shape by a known rolling/granulation apparatus. The spherical molded bodies obtained by the granulation process are sintered by regular gas pressure sintering or hot hydrostatic pressure sintering to obtain spherical sintered bodies of silicon nitride.

In an alternative method, the slurry described above is formed into raw powder by spray drying, and the raw powder is molded into spherical bodies using a known metal press. The spherical molded bodies are subjected to regular gas pressure sintering or hot hydrostatic pressure sintering to form spherical sintered bodies of silicon nitride.

The size of pores in the sintered bodies is regulated by controlling the type and the quantity of the sintering aid, sintering temperature and pressure and the average particle size of the raw material. For example, when the quantity of the sintering aid and the sintering temperature and pressure are increased with the average particle size of the raw material kept small, the densification of the raw material is greatly promoted during sintering. As a result, the pores are generally small.

Accordingly, the sintering aid and sintering conditions are regulated so that a maximum pore size in the interior portions (which change into surface pores after the completion of polishing) of the sintered bodies is not more than 5 μm.

The diameter, sphericity and surface roughness of the sintered bodies thus obtained are regulated by subjecting the sintered bodies to polishing, so that ceramic bearing balls of silicon nitride of not more than 4 mm diameter are formed.

The ceramic bearing balls thus manufactured have a sphericity of not more than 0.08 μm, a surface roughness of not more than 0.012 μm and a maximum surface pore size of not more than 5 μm.

When these ceramic bearing balls are used in a bearing in, for example, a hard disk drive of a computer, irregular vibrations rarely occur, so that the writing and reading of data can be carried out accurately and reliably.

EXAMPLES

Details of experiments carried out so as to ascertain the advantages of the present invention will now be described. However, the present invention shall not be construed as being limited thereto.

Balls of sintered bodies containing silicon nitride as a main component were manufactured by hot hydrostatic pressing. The sintering aid(s) and calcination conditions were varied so that the sizes of the internal pores of the balls varied within the range of the invention. These sintered balls were then polished so that they had the sphericity and surface roughness shown in Table 1 below, to obtain the ceramic bearing balls of Sample Nos. 1–10 of the present invention.

Sintered balls were manufactured as comparative examples in the same manner by varying the sintering aid(s) and calcination conditions so that they had various pore diameters, and these balls were then polished so that they had the sphericity and surface roughness shown in Table 1 below, to form the ceramic bearing balls of comparative Sample Nos. 11–16.

The ceramic bearing balls were cut and maximum pore sizes in the cut surfaces thereof were measured. The results are also shown in Table 1. When the surfaces of the balls are polished, the pores in the inner portions thereof are exposed to the outside and the maximum sizes of internal pores and those of surface pores were regarded as being equal.

Figure 2:
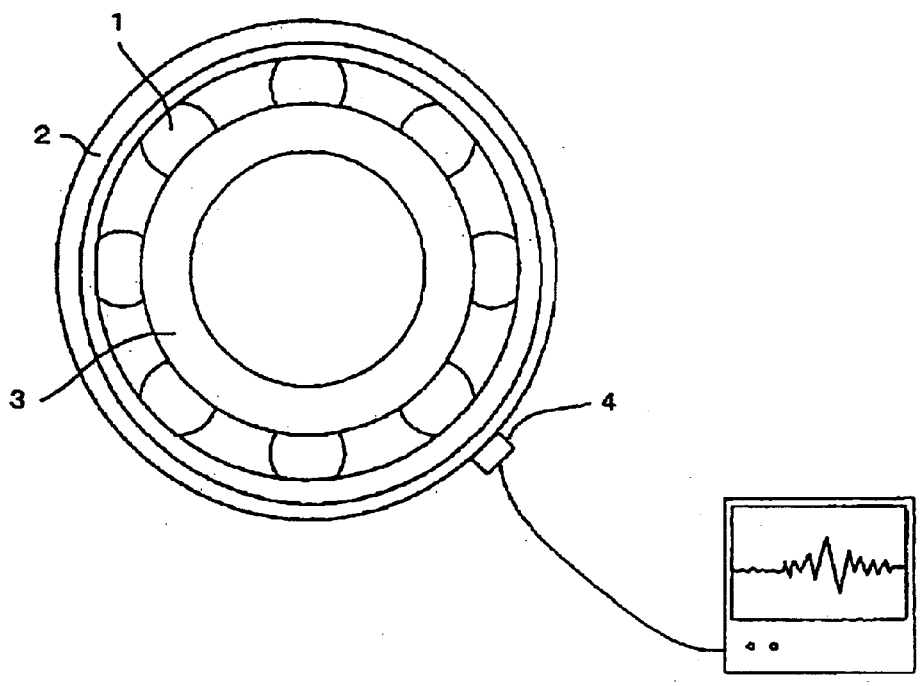
FIG. 2 is an explanatory view showing laboratory equipment for determining vibration levels.

These ceramic bearing balls 1 were arranged between outer and inner races 2, 3 as shown in FIG. 2, to form ball bearings, and the inner race 3 of each bearing was rotated with the outer race 2 fixed, to conduct acoustic (vibration) tests. The intensity of sound occurring when the inner race was rotated at 5000–10000 rpm was picked up at the outer race 2 by a sensor (microphone) 4 to examine whether the output level exceeded a predetermined permissible range (i.e. 30 dB), whereby it was determined whether each ceramic bearing ball 1 had suitable surface characteristics and accuracy. The results are also shown in Table 1. In Table 1, the samples having a sound intensity not greater than 30 dB are marked with O, (satisfactory) and the samples having a sound intensity greater than 30 dB with X (fail).

TABLE 1

|  |  | Sphericity (μm) | Surface roughness (μm) | Maximum pore size (μm) | Results of vibration (acoustic) experiments |
|---|---|---|---|---|---|
| Examples of the invention | 1 | 0.08 | 0.008 | 2 | O |
|  | 2 | 0.06 | 0.006 | 3 | O |
|  | 3 | 0.04 | 0.005 | 2 | O |
|  | 4 | 0.04 | 0.004 | 2 | O |
|  | 5 | 0.03 | 0.005 | 5 | O |
|  | 6 | 0.03 | 0.002 | 3 | O |
|  | 7 | 0.02 | 0.001 | 2 | O |
|  | 8 | 0.08 | 0.012 | 5 | O |
|  | 9 | 0.03 | 0.002 | 1 | O |
|  | 10 | 0.03 | 0.002 | 0 | O |
| Comparative examples | 11 | 0.25 | 0.025 | 10 | X |
|  | 12 | 0.13 | 0.020 | 3 | X |
|  | 13 | 0.25 | 0.025 | 2 | X |
|  | 14 | 0.10 | 0.005 | 3 | X |
|  | 15 | 0.08 | 0.014 | 5 | X |
|  | 16 | 0.08 | 0.008 | 7 | X |

As is clear from Table 1, it has been ascertained that ball bearings using the ceramic bearing balls (Samples Nos. 1–10) of the present invention cause little vibration and are suitable for use in, for example, a hard disk drive of a computer. On the other hand, the ball bearings using the balls of the comparative examples (Sample Nos. 11–16) do not satisfy the conditions for the present invention, such that they cause much vibration and are therefore not suitable.

The present invention is not limited to the above-described embodiments, and it can, of course, be practiced in various modes without departing from the gist thereof.

This application is based on Japanese Patent Application No. Hei. 11-56999, filed on Mar. 4, 1999, which is incorporated herein by reference in its entirety.

What is claimed is:

1. A ceramic ball having a sphericity of not more than about 0.08 μm, a surface roughness of not more than about 0.012 μm and a maximum surface pore size of about 5 μm.

2. The ceramic ball according to claim 1, having a maximum internal pore size of about 5 μm.

3. The ceramic ball according to claim 1, comprising silicon nitride as a main component thereof.

4. A disk drive motor bearing having inner and outer bearing races and, accommodated between the races a plurality of ceramic bearing balls having a sphericity of not more than about 0.08 μm, a surface roughness of not more than about 0.012 μm and a maximum surface pore size of about 5 μm.

5. The disk drive motor bearing according to claim 4, wherein the ceramic bearing balls have a sphericity of about 0.02 μm, a surface roughness of about 0.001 μm and maximum surface pore size of about 2 μm.

* * * * *